Aug. 6, 1929.  E. THOMSON  1,723,959
SAFETY DEVICE FOR GAS TANKS
Filed May 5, 1927
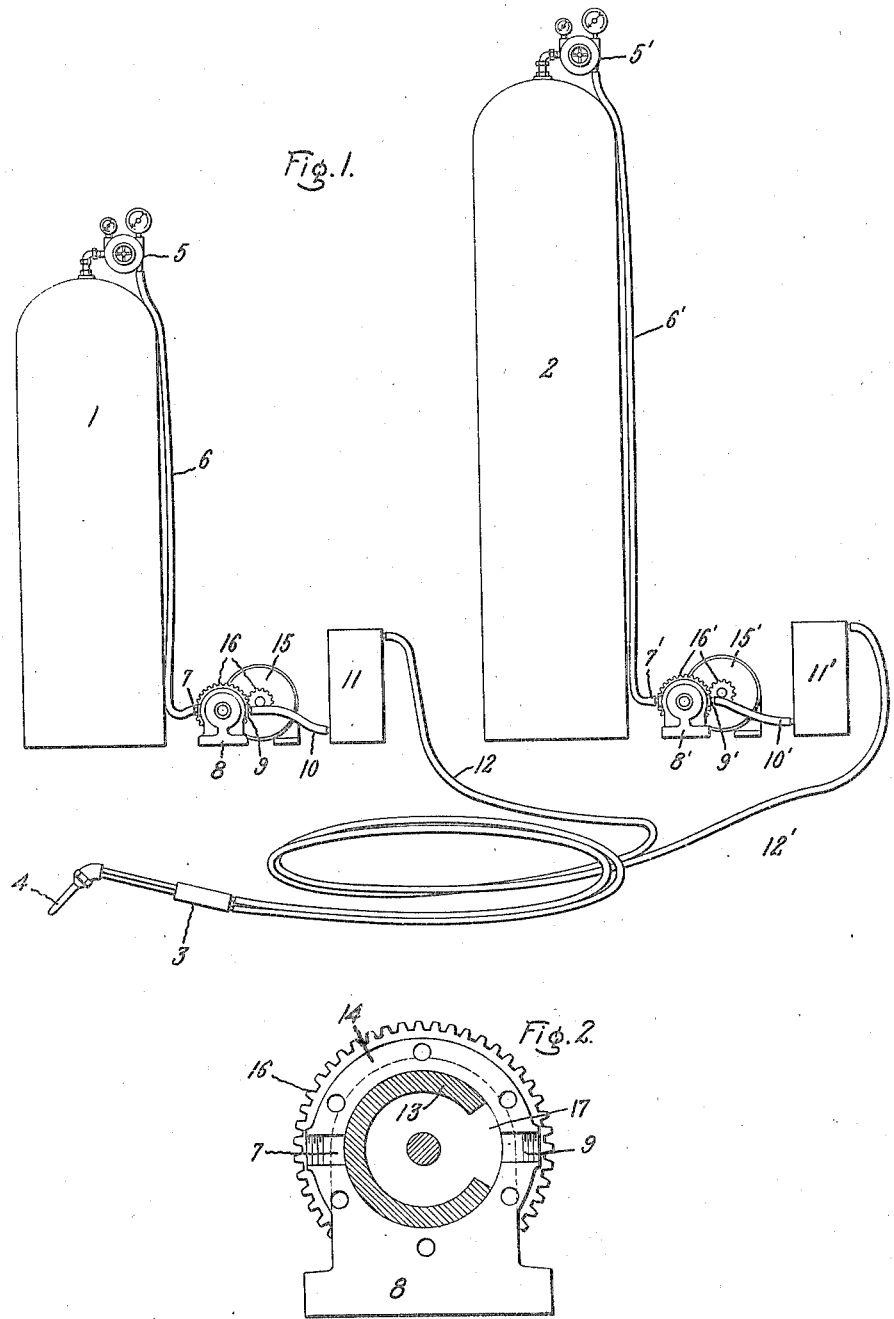
Inventor:
Elihu Thomson,
by (signature)
His Attorney Patented Aug. 6, 1929.

1,723,959

UNITED STATES PATENT OFFICE.

ELIHU THOMSON, OF SWAMPSCOTT, MASSACHUSETTS, ASSIGNOR TO GENERAL ELECTRIC COMPANY, A CORPORATION OF NEW YORK.

SAFETY DEVICE FOR GAS TANKS.

Application filed May 5, 1927. Serial No. 189,163.

My invention relates to safety devices for gas tanks. More particularly my invention relates to such safety devices when used in conjunction with apparatus for welding and cutting metal by the use of high temperature flames produced by the combustion of various combustible gases with various combustion supporting gases.

In practice, either acetylene or hydrogen is usually employed as the combustible gas, but various other gases such as Blau gas, Pintsch gas, water gas, butane, etc. may be used with a considerable degree of success. Oxygen in different states of purity is usually employed as the combustion supporting gas. Torches for mixing and burning such gases are in very general use at the present time. In all such torches trouble is experienced by flash-backs; that is, by a premature combustion of the gases in the torch. The principal causes of flash-backs have been attributed to improper gas pressures, clogging of the tip of the torch or burner, heating of the tip of the burner, etc. There is always the possibility that the flame resulting from such a flash-back will be carried back into the oxygen, hydrogen, acetylene or other gas tanks used to supply the gases used and in so doing become responsible for a violent explosion with its acompanying dangers.

Early inventors of welding apparatus depending on the principle of the Davy safety lamp have sought to prevent such explosions by providing chambers in the gas lines between the burner tip and the source of gas supply which have been filled with porous substances such as shot or mesh wire which permit the flow of gas therethrough but which absorb the heat of a flame so that a flash-back is extinguished before passing through these chambers toward the gas tanks.

It is an object of my invention to provide a safety device for gas tanks that does not offer the resistance to the flow of gas that shot and wire gauze offer and which operates to prevent flash-backs traveling back to the source of gas supply.

Further objects and advantages of my invention will become evident from the following description and claims.

According to my invention, I transfer certain predetemined quantities of the gases to the torch or burner from the sources of supply through the agency of rotary valves that by reason of their construction interpose the structure of their parts to the passage back from the torch to the sources of gas supply of flames resulting from flash-backs.

Referring to the drawing, Fig. 1 illustrates gas welding and cutting equipment embodying my invention, and Fig. 2 illustrates a cross sectional view of the rotary valve illustrated in Fig. 1.

In Fig. 1, a combustible gas such as acetylene and a combustion supporting gas such as oxygen are supplied from tanks or containers 1 and 2 to a torch 3 through whose agency they are applied to the work from a tip 4 in welding and cutting processes making use of high temperature flames. The acetylene or combustible gas is supplied through a pressure regulator 5 and a conduit or hose 6 to the intake port 7 of a valve 8. The gas is discharged from this valve through an exhaust port 9 and a conduit 10 into a surge tank or chamber 11 from which it is conducted through a conduit 12 to the torch 3. Under certain conditions determined by the length and size of the conduit used to connect the exhaust port of the valve 8 with the torch 3, it may be found possible to dispense with the surge tank 11 since the conduit itself may act to eliminate surge impulses produced as a result of the operation of the valve 8.

Valve 8, as is best shown by the sectional view of Fig. 2, is a totally enclosed rotary valve comprising a movable part or sleeve 13 rotating within a fixed part or casing 14. The casing 14 completely encloses the sleeve 13 and forms part of the conduit between the gaseous supply and the torch. Sleeve 13 is positively rotated by a motor 15 connected therewith through gears 16. The sleeve or moveable part of the valve is constructed and arranged periodically to uncover the intake port 7 and the exhaust port 9 while at no time leaving a free passage from the intake port 7 to the exhaust port 9. As the sleeve member 13 rotates, a charge of gas will be delivered to the inside of the sleeve through its port 17 from the intake port 7, which charge will be later delivered to the exhaust port 9 of the valve when the parts are in the position shown in Fig. 2. The amount of the gas passing through the valve 8 will depend upon the number of revolutions that the sleeve 13 completes in a given length of time, and in this respect the valve 8 acts as a measuring valve transferring a measured quantity of gas with each revolution. As has been noted, there is at no time a complete and open passageway from the exhaust port 9 to the intake port 7 of the valve 8 due to the interposition at all times of the sleeve 13 which covers either one or the other or both of these ports. The sleeve 13 at all times thus offers an effective barrier against any back travel of the flame resulting from a flash-back in the torch 3 and guards against the danger of such a flash-back reaching the gas tank 1 which would result in an explosion.

The oxygen or combustion supporting gas is supplied from tank 2 to the torch 3 in like manner to that described for supplying the combustible gas from tank 1 to the torch 3 and the various agencies have been indicated by like reference numerals primed to designate parts corresponding to those previously described.

Although the valve 8 is shown located at a point near the tanks and remote from the tip 4 of the welding torch 3, it is to be understood that it may be located anywhere in the gas lines between the gas tanks and the torch tip. For example, the valves may be placed in the torch itself and a single motor means be used to drive the valve in the combustible gas line as well as the valve in the combustion supporting gas line. When the motors and valves are located at the gas tanks, as shown, means may be provided on or near the gas torch for remotely controlling the motor means to vary the quantity of gas delivered from the tanks. It is not necessary to use pressure regulators, as has been shown, for the rotary valves themselves act as pressure regulators by controlling the amount of gas passing from the tank to the torch.

It will be apparent to those skilled in the art that modifications may be made in the particular arrangements disclosed without departing from my invention, and I therefore aim in the appended claims to cover all such changes and variations as fall within the true spirit and scope of my invention.

What I claim as new and desire to secure by Letters Patent of the United States, is:—

1. A safety device for use in conjunction with a gas container for preventing the entrance of a flame within said container comprising a conduit for conducting the gas from said container and means interposed in and completely enclosed within said conduit for transferring gas from one side thereof to the other side thereof while preventing at all times a free passage in either direction to or from said container.

2. In combination with a gas torch and a source of gas supply under pressure, a conduit for conducting gas from said source of gas supply to said torch, means interposed in said conduit for transferring measured quantities of gas from one side thereof to the other side thereof while preventing a free passage in either direction at any time between said source of supply and said torch and means for controlling the rate of transfer of said measured quantities to control the pressure of the gas supplied to said torch.

3. In combination with a gas torch and a source of gas supply, a totally enclosed rotary valve for transferring predetermined quantities of gas from said source of gas supply to the tip of said torch while preventing a free passage in either direction at any time between said source of supply and said tip and means for positively rotating said valve.

4. In combination with a gas torch and a source of gas supply, a conduit for conducting gas from said source of gas supply, means interposed in said conduit for transferring predetermined quantities of gas from said source of gas supply to the tip of said torch while preventing a free passage in either direction at any time between said source of supply and said tip and a surge chamber interposed between said means and said tip.

5. In combination with a gas torch and a source of gas supply, a conduit for conducting gas from said source of gas supply to the tip of said torch, a rotary valve interposed in said conduit constructed and arranged for transferring predetermined quantities of said gas from said source of gas supply to the tip of said torch while preventing a free passage in either direction at any time between said source of supply and said tip, and means for rotating said valve at predetermined rates of speed for delivering predetermined quantities of gas from said source of supply to said tip.

6. Gas welding apparatus comprising a plurality of tanks containing combustible and combustion supporting gases, a welding torch for mixing and burning such gases, conduits connecting said tanks with said torch and means interposed in and completely enclosed within said conduits for transferring gas from said tanks to the tip of said torch in predetermined quantities while preventing a free passage in either direction at any time between said burner tip and said tanks.

7. Gas welding apparatus comprising a plurality of tanks containing combustible and combustion supporting gases, a welding torch for mixing and burning such gases, conduits connecting said tanks with said torch, means interposed in said conduits for transferring gas from said tanks to the tip of said torch in predetermined quantities while preventing a free passage in either direction at any time between said burner tip and said tanks, and surge chambers interposed between said tip and said means.

In witness whereof, I have hereunto set my hand this second day of May, 1927.

ELIHU THOMSON.